US012061478B2

United States Patent
Lennie et al.

(10) Patent No.: US 12,061,478 B2
(45) Date of Patent: Aug. 13, 2024

(54) DETECTION OF ACTIVE EMERGENCY VEHICLES SHARED WITHIN AN AUTONOMOUS VEHICLE FLEET

(71) Applicant: GM Cruise Holdings LLC, San Francisco, CA (US)

(72) Inventors: Sandra Lennie, San Mateo, CA (US); Jason Yun, San Francisco, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 0 days.

(21) Appl. No.: 18/345,564

(22) Filed: Jun. 30, 2023

(65) Prior Publication Data

US 2023/0341854 A1    Oct. 26, 2023

Related U.S. Application Data

(63) Continuation of application No. 17/364,764, filed on Jun. 30, 2021, now Pat. No. 11,726,476, which is a
(Continued)

(51) Int. Cl.
    *G05D 1/00*    (2024.01)
(52) U.S. Cl.
    CPC ......... *G05D 1/0088* (2013.01); *G05D 1/0027* (2013.01); *G05D 1/0291* (2013.01)
(58) Field of Classification Search
    CPC .. G05D 1/0088; G05D 1/0027; G05D 1/0291; G08G 1/0965; G08G 1/096725;
    (Continued)

(56) References Cited

U.S. PATENT DOCUMENTS

| 4,741,163 A | 5/1988 | Hidaka et al. |
| 6,087,961 A | 7/2000 | Markow |
| (Continued) | | |

FOREIGN PATENT DOCUMENTS

GB    2558404 A    7/2018

OTHER PUBLICATIONS

DE 102014011630 A1 with English translation; Date Filed Aug. 1, 2014; Date Published Mar. 26, 2015. (Year: 2015).*
(Continued)

*Primary Examiner* — Calvin Cheung

(57) ABSTRACT

Various technologies described herein pertain to sharing of detection of active emergency vehicles within an autonomous vehicle fleet. Information specifying detection of an active emergency vehicle at a first location in an environment is received. The active emergency vehicle is detected based upon sensor inputs of a first autonomous vehicle in an autonomous vehicle fleet. A second autonomous vehicle, at a second location, in the autonomous vehicle fleet is identified as being approached by the active emergency vehicle based on the information specifying the detection of the active emergency vehicle at the first location and the second location of the second autonomous vehicle. A remote assistance session for the second autonomous vehicle is caused to be initiated based on the second autonomous vehicle being identified as being approached by the active emergency vehicle. The second autonomous vehicle is controllable by a remote operator during the remote assistance session.

13 Claims, 7 Drawing Sheets

Related U.S. Application Data continuation of application No. 16/288,086, filed on Feb. 27, 2019, now Pat. No. 11,079,759.

(58) Field of Classification Search
CPC ......... G08G 1/096741; G08G 1/09675; G08G 1/096791; G08G 1/22; B60W 2050/0095; B60W 60/005; B60W 2300/105
See application file for complete search history.

(56) References Cited

U.S. PATENT DOCUMENTS

| | | | |
|---|---|---|---|
| 8,838,321 | B1 | 9/2014 | Ferguson |
| 9,278,689 | B1 | 3/2016 | Delp |
| 9,280,710 | B1* | 3/2016 | Ferguson ............. G06V 20/582 |
| 9,451,020 | B2 | 9/2016 | Liu et al. |
| 9,463,794 | B1* | 10/2016 | Silver ................ G01C 21/3602 |
| 9,934,685 | B1 | 4/2018 | Bernhardt et al. |
| 10,049,570 | B2 | 8/2018 | Foreman et al. |
| 10,156,845 | B1 | 12/2018 | Greenberger et al. |
| 10,156,848 | B1 | 12/2018 | Konrardy et al. |
| 10,896,606 | B1 | 1/2021 | Hayes et al. |
| 11,079,759 | B2 | 8/2021 | Lennie et al. |
| 11,726,476 | B2 | 8/2023 | Lennie et al. |
| 2005/0021745 | A1 | 1/2005 | Bookman et al. |
| 2008/0162027 | A1* | 7/2008 | Murphy ............... G05D 1/0274 701/1 |
| 2012/0226548 | A1 | 9/2012 | Hanna |
| 2013/0224721 | A1 | 8/2013 | Gilling |
| 2014/0330576 | A1 | 11/2014 | Bauer |
| 2015/0105999 | A1 | 4/2015 | Sangameswaran et al. |
| 2017/0123428 | A1 | 5/2017 | Levinson et al. |
| 2018/0211528 | A1 | 7/2018 | Seifert |
| 2019/0049994 | A1 | 2/2019 | Pohl et al. |
| 2019/0163176 | A1 | 5/2019 | Wang et al. |
| 2020/0089253 | A1 | 3/2020 | Sudo |
| 2020/0198626 | A1 | 6/2020 | Yanagi et al. |
| 2020/0272150 | A1 | 8/2020 | Lennie et al. |
| 2021/0325884 | A1 | 10/2021 | Lennie et al. |

OTHER PUBLICATIONS

"Non-Final Office Action for U.S. Appl. No. 16/288,086", Mailed Date: Jan. 27, 2021, 10 Pages.

"Reply to Non-Final Office Action for U.S. Appl. No. 16/288,086", filed Apr. 26, 2021, 13 Pages.

"Notice of Allowance and Fees Due for U.S. Appl. No. 16/288,086", Mailed Date: May 19, 2021, 10 Pages.

"Office Action for U.S. Appl. No. 17/364,764", Mailed Date: Dec. 19, 2022, 10 pages.

"Response to the Office Action for U.S. Appl. No. 17/364,764", filed Mar. 16, 2023, 11 pages.

"Notice of Allowance and Fees Due for U.S. Appl. No. 17/364,764", Mailed Date: Mar. 31, 2023, 7 pages.

\* cited by examiner

DETECTION OF ACTIVE EMERGENCY VEHICLES SHARED WITHIN AN AUTONOMOUS VEHICLE FLEET

CROSS-REFERENCE TO RELATED APPLICATION

This application is a continuation of U.S. patent application Ser. No. 17/364,764, filed on Jun. 30, 2021, and entitled "DETECTION OF ACTIVE EMERGENCY VEHICLES SHARED WITHIN AN AUTONOMOUS VEHICLE FLEET", which is a continuation of U.S. Pat. No. 11,079,759, filed on Feb. 27, 2019, and entitled "DETECTION OF ACTIVE EMERGENCY VEHICLES SHARED WITHIN AN AUTONOMOUS VEHICLE FLEET", the entireties of which are incorporated herein by reference.

BACKGROUND

An autonomous vehicle is a motorized vehicle that can operate without human conduction. An exemplary autonomous vehicle includes a plurality of sensor systems such as, but not limited to, a lidar sensor system, a camera sensor system, and a radar sensor system, amongst others. The autonomous vehicle operates based on sensor inputs received by the sensor systems, wherein the sensor inputs can be analyzed by the autonomous vehicle to identify objects (e.g., other vehicles, pedestrians, etc.) in regions surrounding the autonomous vehicle.

Similar to other vehicles on the road, autonomous vehicles typically need to timely respond to active emergency vehicles within an environment. For instance, an autonomous vehicle desirably pulls over and stops when approached by an ambulance having an illuminated emergency light and/or a siren that is emitting a sound (e.g., to allow the ambulance to pass by the autonomous vehicle). According to another illustration, an autonomous vehicle desirably stops when approached by a police vehicle having an illuminated emergency light and/or siren emitting a sound (e.g., the autonomous vehicle remains stopped if pulled over by the police vehicle). Conventional approaches for handling active emergency vehicles oftentimes include an autonomous vehicle detecting an active emergency vehicle within proximity of the autonomous vehicle based on sensor inputs; thereafter, the autonomous vehicle can initiate a remote assistance session responsive to the detection of the active emergency vehicle. During the remote assistance session, the autonomous vehicle can be controllable by a remote operator.

The remote operator can decide on an action to take with the autonomous vehicle once the active emergency vehicle is detected during the remote assistance session. The remote operator can control the autonomous vehicle when the active emergency vehicle is detected due to difficulty providing an autonomous response with respect to the active emergency vehicle. For instance, various nuances in operation of the autonomous vehicle may be appropriate to adequately respond to the active emergency vehicle.

With traditional approaches, classification of active emergency vehicles by autonomous vehicles is oftentimes difficult. For instance, conventional classification approaches may improperly detect an active emergency vehicle (false positive) or miss detecting an active emergency vehicle (false negative) within proximity of an autonomous vehicle. Moreover, classification of an active emergency vehicle can be time consuming (e.g., the emergency vehicle may be occluded from a point of the autonomous vehicle); thus, a period of time can pass while the autonomous vehicle detects whether an active emergency vehicle is nearby the autonomous vehicle in an environment, which delays the autonomous vehicle from initiating a remote assistance session. Thus, by the time the autonomous vehicle has established a remote assistance session, the active emergency vehicle may have passed the autonomous vehicle and/or an in-vehicle operator may have manually taken over control of the autonomous vehicle from within the autonomous vehicle.

SUMMARY

The following is a brief summary of subject matter that is described in greater detail herein. This summary is not intended to be limiting as to the scope of the claims.

Described herein are various technologies that pertain to sharing of detection of active emergency vehicles within an autonomous vehicle fleet. Information specifying detection of an active emergency vehicle at a first location in an environment can be received. The active emergency vehicle can be detected at least in part based upon sensor inputs of a first autonomous vehicle in an autonomous vehicle fleet. Further, a second autonomous vehicle in the autonomous vehicle fleet can be identified as being approached by the active emergency vehicle. The second autonomous vehicle can be at a second location in the environment. The second autonomous vehicle can be identified as being approached by the active emergency vehicle based on the information specifying the detection of the active emergency vehicle at the first location in the environment and the second location in the environment of the second autonomous vehicle. For example, the information specifying the detection of the active emergency vehicle at the first location in the environment can include information specifying a direction of travel of the active emergency vehicle. Following this example, the second autonomous vehicle can be identified as being approached by the active emergency vehicle when the direction of travel of the active emergency vehicle is towards the second location of the second autonomous vehicle as well as the first location and the second location being within a predetermined distance. Moreover, a remote assistance session for the second autonomous vehicle can be caused to be initiated based on the second autonomous vehicle being identified as being approached by the active emergency vehicle. The second autonomous vehicle can be controllable by a remote operator during the remote assistance session. It is further contemplated that substantially any number of other autonomous vehicles in the autonomous vehicle fleet can similarly being identified as being approached by the active emergency vehicle and corresponding remote assistance session(s) can be caused to be initiated.

According to various examples, an emergency vehicle can be a fire truck, a police car, or an ambulance. An emergency vehicle can be detected as being an active emergency vehicle when a siren is sounded by the active emergency vehicle or an emergency light of the active emergency vehicle is illuminated. Moreover, pursuant to various examples, it is contemplated that the approaches set forth herein can likewise be applied to other types of vehicles that can be detected in an environment (e.g., detecting a stopped school bus with a stop sign extended and lights illuminated).

Pursuant to various embodiments, an indication specifying that an autonomous vehicle in an autonomous vehicle fleet is being approached by an active emergency vehicle can be received. Responsive to receiving the indication, off-vehicle monitoring of sensor inputs of the autonomous vehicle can be enabled. Further, a remote assistance session of the autonomous vehicle can be initiated responsive to a selection received during the off-vehicle monitoring of the sensor inputs of the autonomous vehicle (e.g., a manual selection received from a remote operator during the off-vehicle monitoring). In accordance with other embodiments, it is contemplated that a remote assistance session can be automatically initiated, information specifying detection of the active emergency vehicle can be transmitted to an autonomous vehicle, or the like responsive to identifying that the autonomous vehicle is being approached by the active emergency vehicle.

As set forth herein, an active emergency vehicle can be tracked, which enables learning from previous classification responses performed by one or more autonomous vehicles in the environment. Thus, other autonomous vehicles in the fleet of autonomous vehicles can utilize such previous classification responses. The techniques set forth herein enable identifying when an active emergency vehicle is approaching a differing autonomous vehicle and proactively responding (e.g., causing initiation of a remote assistance session for the differing autonomous vehicle being approached by the active emergency vehicle), rather than treating each active emergency vehicle as a separate instance.

The techniques set forth herein enable an autonomous vehicle to more quickly start a remote assistance session when within proximity of an approaching active emergency vehicle as compared to traditional techniques that rely on each autonomous vehicle independently classifying objects nearby as being active emergency vehicles. Such proactive initiation of the remote assistance session can reduce a likelihood of an in-vehicle operator manually taking over control of an autonomous vehicle (e.g., if an in-vehicle operator is in the autonomous vehicle) and/or can enable the autonomous vehicle to timely respond to the active emergency vehicle (e.g., allowing the autonomous vehicle to more quickly get out of the way of the active emergency vehicle). Moreover, the techniques set forth herein enable reducing false positive and false negative detection of active emergency vehicles.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
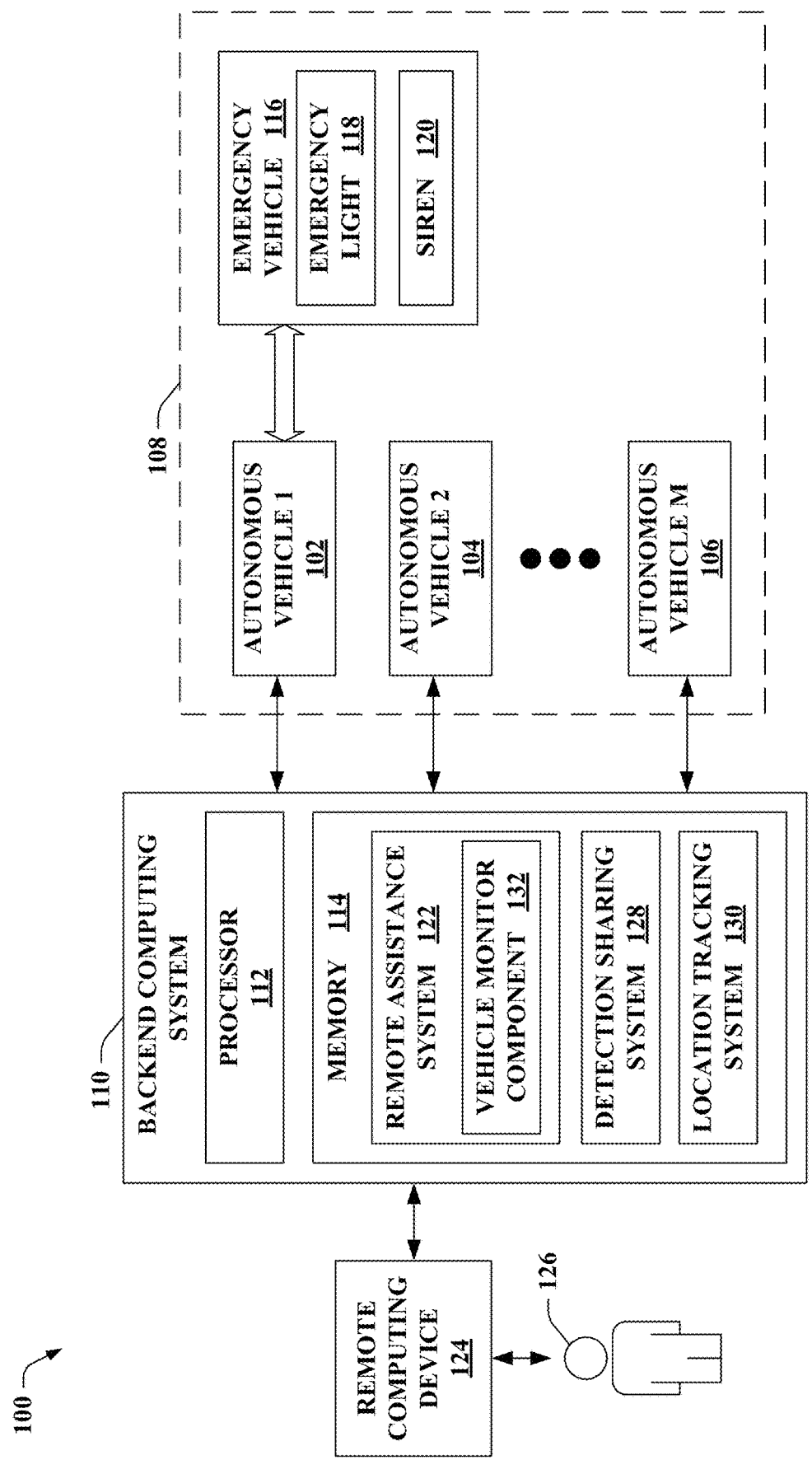
FIG. 1 illustrates a functional block diagram of an exemplary system that shares detection of active emergency vehicles within an autonomous vehicle fleet.

Various technologies pertaining to sharing of detection of active emergency vehicles within an autonomous vehicle fleet are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Further, as used herein, the term "exemplary" is intended to mean "serving as an illustration or example of something."

Referring now to the drawings, FIG. 1 illustrates a system 100 that shares detection of active emergency vehicles within an autonomous vehicle fleet. The system 100 includes an autonomous vehicle 1 102, an autonomous vehicle 2 104, . . . , and an autonomous vehicle M 106, where M can be substantially any integer (collectively referred to herein as autonomous vehicles 102-106). The autonomous vehicles 102-106 form an autonomous vehicle fleet in an environment 108.

Moreover, various emergency vehicles can be in the environment 108. For instance, an emergency vehicle 116 is depicted as being in the environment 108. While one emergency vehicle is shown in the environment 108, it is contemplated that substantially any number of emergency vehicles can be in the environment 108; thus, the examples set forth herein can be extended to scenarios in which more than one emergency vehicle is in the environment 108.

According to an example, the emergency vehicle 116 can be a fire truck, a police car, or an ambulance. The emergency vehicle 116 can include an emergency light 118 and/or a siren 120. An emergency vehicle is referred to herein as an active emergency vehicle when an emergency light of the emergency vehicle is illuminated and/or when a siren of the emergency vehicle is sounded (e.g., the emergency vehicle 116 is referred to as the active emergency vehicle 116 when the emergency light 118 of the emergency vehicle 116 is illuminated and/or when the siren 120 of the emergency vehicle 116 is sounded).

Rules of the road can provide that, upon approach of an active emergency vehicle which is sounding a siren and/or which has at least one lighted lamp that is visible (e.g., the emergency vehicle 116 sounding the siren 120 and/or illuminating the emergency light 118), surrounding traffic typically should yield the right-of-way, drive to a right-hand edge or curb of a road, clear an intersection, stop, and remain stopped until the active emergency vehicle passes. Utilizing the techniques set forth herein, the autonomous vehicles 102-106 can share the detection of the active emergency vehicles, which can support the autonomous vehicles 102-106 complying with such rules of the road.

The system 100 further includes a backend computing system 110 (e.g., a computing system) that is in communication with the autonomous vehicles 102-106 in the fleet. The backend computing system 110 includes at least one processor 112 and memory 114. The memory 114 includes computer-executable instructions that are executed by the at least one processor 112. As described in greater detail herein, the memory 114 can include computer-executable instructions for sharing detection of active emergency vehicle(s) within the fleet of the autonomous vehicles 102-106.

Many of the examples set forth herein describe a first autonomous vehicle (e.g., the autonomous vehicle 1 102) detecting the active emergency vehicle 116 (e.g., with the siren 120 sounding and/or the emergency light 118 illuminated) at a first location in the environment 108. Such detection of the active emergency vehicle 116 can be shared with other autonomous vehicles in the fleet (e.g., the autonomous vehicle 2 104, . . . , and the autonomous vehicle M 106 or a subset thereof). It is to be appreciated, however, that these examples can be extended to scenarios in which other autonomous vehicle(s) in the fleet detect active emergency vehicle(s) (e.g., the active emergency vehicle 116, other active emergency vehicle(s)).

According to various examples, the autonomous vehicle 1 102 can detect the emergency vehicle 116 at the first location in the environment 108 based at least in part on sensor inputs of the autonomous vehicle 1 102. Moreover, the autonomous vehicle 1 102 can detect that the emergency vehicle 116 is an active emergency vehicle (e.g., the emergency light 118 is illuminated and/or the siren 120 is sounded). For instance, the autonomous vehicle 1 102 can classify the emergency vehicle 116 as an active emergency vehicle based on visual detection of the emergency vehicle 116 (e.g., based on lidar sensor input, camera sensor input, etc. that represent the emergency vehicle 116) as well as a state of the emergency light 118 (e.g., based on camera sensor input that captures light emitted by the emergency light 118). Additionally or alternatively, the autonomous vehicle 1 102 can classify the emergency vehicle 116 as an active emergency vehicle based on audio detection of a state of the siren 120 of the emergency vehicle 116 (e.g., based on audio sensor input that captures sound emitted by the siren 120). Moreover, the autonomous vehicle 1 102 can detect a direction of travel and a speed of the active emergency vehicle 116.

Detection of the active emergency vehicle 116 by the autonomous vehicle 1 102 can be difficult and time-consuming. For instance, classification may result in active emergency vehicles improperly being detected when not actually in the environment 108 (false positives) and/or missing detection of active emergency vehicles actually in the environment 108 (false negatives). Moreover, detection of the active emergency vehicle 116 by the autonomous vehicle 1 102 may be delayed relative to detection of the active emergency vehicle 116 by a human. According to an illustration, a person can see the emergency light 118 flashing and/or hear sound from the siren 120 prior to seeing the emergency vehicle 116, particularly if the emergency vehicle 116 is occluded or partially occluded. Detection of the active emergency vehicle 116 by the autonomous vehicle 1 102 may rely upon the emergency vehicle 116 itself being detected based on sensor inputs of the autonomous vehicle 1 102 (e.g., detecting illumination of the emergency light 118 and/or detecting an audible sound emitted by the siren 120 may be insufficient for the autonomous vehicle 1 102 to detect the active emergency vehicle 116), whereas a human driver may identify the active emergency vehicle 116 without seeing the emergency vehicle itself. Further, detection of the active emergency vehicle 116 by the autonomous vehicle 1 102 may be more difficult at night as compared to during the day.

Presence of the active emergency vehicle 116 at the first location in the environment 108, as detected by the autonomous vehicle 1 102, can be confirmed in a remote assistance session. Moreover, the autonomous vehicle 1 102 can be remotely controlled during the remote assistance session. In particular, the memory 114 of the backend computing system 110 can include a remote assistance system 122 that can establish separate remote assistance sessions for autonomous vehicles 102-106 and remote computing devices utilized by remote operators. The example depicted in FIG. 1 includes one remote computing device 124 and one remote operator 126; however, it is contemplated that the system 100 can include substantially any number of remote computing devices and remote operators. The remote assistance system 122 can match an autonomous vehicle to a remote computing device (and a corresponding remote operator) from a plurality of remote computing devices (and a corresponding plurality of remote operators) for a remote assistance session. Moreover, during a remote assistance session, the remote assistance system 122 can exchange data and commands between a matched autonomous vehicle and remote computing system. For instance, sensor inputs obtained by an autonomous vehicle can be transmitted to a matched remote computing system via the remote assistance system 122 (e.g., to enable the remote operator to view video, listen to audio, etc. captured by sensor systems of the autonomous vehicle) and/or commands generated by the remote computing system (e.g., responsive to input from a remote operator of the remote computing system) can be transmitted from the remote computing system to the autonomous vehicle via the remote assistance system 122.

According to the continuing example, the autonomous vehicle 1 102 can detect the active emergency vehicle 116 at the first location in the environment 108 based on sensor inputs of the autonomous vehicle 1 102 with a certain degree of confidence in the classification. In response, the autonomous vehicle 1 102 can send a request to the remote assistance system 122 of the backend computing system 110 to establish a remote assistance session while also setting a stop point to cause the autonomous vehicle 1 102 to come to a stop. Responsive to the request, the remote assistance system 122 can match the autonomous vehicle 1 102 to a remote computing device and remote operator for the remote assistance session. For instance, the autonomous vehicle 1 102 can be matched to the remote computing device 124 and the remote operator 126. The remote operator 126 can utilize the remote computing device 124 to analyze sensor inputs from the autonomous vehicle 1 102 during the remote assistance session to confirm whether or not the active emergency vehicle 116 is at the first location in the environment 108. Moreover, the remote operator 126 can control operation of the autonomous vehicle 1 102 during the remote assistance session (e.g., command(s) can be sent from the remote computing device 124 to the autonomous vehicle 1 102 causing the autonomous vehicle 1 102 to stop, pull over, perform a particular maneuver, etc.).

It is contemplated that the active emergency vehicle 116 can pass the autonomous vehicle 1 102 during the period of time in which the remote assistance session is being established (e.g., when requested responsive to detection of the active emergency vehicle 116). Accordingly, the remote operator 126 may be unable to timely control the autonomous vehicle 1 102 to desirably respond to the active emergency vehicle 116 during the remote assistance session (e.g., although the remote operator 126 may still be able to confirm the existence of the active emergency vehicle 116 at the first location in the environment 108). To deal with the foregoing, the system 100 enables detection of active emergency vehicles to be shared amongst the autonomous vehicles 102-106.

The memory 114 of the backend computing system 110 can include a detection sharing system 128 that can distribute information concerning detection of an active emergency vehicle to other autonomous vehicles in a path of the active emergency vehicle. The detection sharing system 128 can receive information specifying detection of the active emergency vehicle 116 at the first location in the environment 108. In the example set forth above, the active emergency vehicle 116 can be detected at least in part based on the sensor inputs of the autonomous vehicle 1 102 in the autonomous vehicle fleet 102-106. Moreover, the active emergency vehicle 116 can be confirmed at the first location in the environment 108 during a remote assistance session (e.g., by the remote operator 126). The detection sharing system 128 can identify a second autonomous vehicle (e.g., the autonomous vehicle 2 104) in the autonomous vehicle fleet 102-106 being approached by the active emergency vehicle 116. While many of the examples set forth herein describe the autonomous vehicle 2 104 being identified by the detection sharing system 128 as being approached by the active emergency vehicle 116, it is contemplated that other autonomous vehicles in the fleet can additionally or alternatively be identified as being approached by the active emergency vehicle 116 (e.g., more than one of the autonomous vehicles 102-106 can concurrently be approached by the active emergency vehicle 116).

The detection sharing system 128 can receive the information specifying the detection of the active emergency vehicle 116 at the first location in the environment 108 responsive to the first autonomous vehicle (e.g., the autonomous vehicle 1 102) detecting the active emergency vehicle 116 from the sensor inputs of the first autonomous vehicle. According to another example, the detection sharing system 128 can receive the information specifying the detection of the active emergency vehicle 116 at the first location in the environment 108 responsive to the first autonomous vehicle initiating a remote assistance session via the remote assistance system 122 responsive to the first autonomous vehicle detecting the active emergency vehicle 116 from the sensor inputs of the first autonomous vehicle. In accordance with yet another example, the detection sharing system 128 can receive the information specifying the detection of the active emergency vehicle 116 at the first location in the environment 108 responsive to confirmation of the active emergency vehicle 116 being at the first location in the environment 108 during a remote assistance session of the first autonomous vehicle (e.g., as provided by the remote operator 126 utilizing the remote computing device 124). As noted above, the remote assistance session can be initiated responsive to the first autonomous vehicle detecting the active emergency vehicle 116 from the sensor inputs of the first autonomous vehicle.

Moreover, the memory 114 of the backend computing system 110 can include a location tracking system 130. The location tracking system 130 can track locations of the autonomous vehicles 102-106 in the environment 108 in substantially any manner (e.g., based on received Global Positioning System (GPS) data). According to an example, the location tracking system 130 can detect that the autonomous vehicle 2 104 is at a second location in the environment 108. Following this example, the detection sharing system 128 can identify the autonomous vehicle 2 104 as being approached by the active emergency vehicle 116 based on the information specifying the detection of the active emergency vehicle 116 at the first location in the environment 108 and the second location in the environment 108 of the autonomous vehicle 2 104. Further, the detection sharing system 128 can cause a remote assistance session for the autonomous vehicle 2 104 to be initiated based on the autonomous vehicle 2 104 being identified as being approached by the active emergency vehicle 116. The autonomous vehicle 2 104 can be controllable by a remote operator during the remote assistance session. Accordingly, the detection sharing system 128 enables a remote assistance session for the second autonomous vehicle (e.g., the autonomous vehicle 2 104) to be proactively initiated either without or prior to the second autonomous vehicle attempting to initiate a remote assistance session.

The information specifying the detection of the active emergency vehicle 116 at the first location in the environment 108 can include information specifying a direction of travel of the active emergency vehicle 116. Moreover, the second autonomous vehicle (e.g., the autonomous vehicle 2 104) can be identified by the detection sharing system 128 as being approached by the active emergency vehicle when the direction of travel of the active emergency vehicle 116 is towards the second location in the environment 108 of the second autonomous vehicle and when the first location and the second location are within a predetermined distance. For instance, the predetermined distance can be 1000 yards; however, the claimed subject matter is not so limited. According to an example, the information specifying the detection of the active emergency vehicle 116 at the first location in the environment 108 can additionally or alternatively include information specifying the first location in the environment 108. The information specifying the first location in the environment 108 can include an indication of a road on which the active emergency vehicle 116 is traveling, a lane in which the active emergency vehicle 116 is traveling, geographic coordinates of the first location, or the like. Moreover, information concerning road(s) connected to the road on which the active emergency vehicle 116 is traveling can be included in the information specifying the detection of the active emergency vehicle 116 at the first location in the environment 108 or can be identified from map data or substantially any other source. Thus, the distance between the first location and the second location can be a distance of travel on road(s) in the environment 108.

According to an example, the detection sharing system 128 can cause a remote assistance session for an autonomous vehicle to be initiated by automatically initiating the remote assistance session for the autonomous vehicle responsive to the autonomous vehicle being identified as being approached by an active emergency vehicle. By way of illustration, the detection sharing system 128 can identify that the autonomous vehicle 2 104 is being approached by the active emergency vehicle 116. The detection sharing system 128 can send a request to the remote assistance system 122 to initiate a remote assistance session for the autonomous vehicle 2 104 responsive to identifying that the autonomous vehicle 2 104 is being approached by the active emergency vehicle 116. The remote assistance system 122 can establish the remote assistance session for the autonomous vehicle 2 104 in response to the request received from the detection sharing system 128. For instance, the detection sharing system 128 can automatically initiate the remote assistance session for the autonomous vehicle 2 104 at a time when the autonomous vehicle 2 104 is at a predefined distance from the active emergency vehicle 116.

According to another example, the detection sharing system 128 can cause a remote assistance session for an autonomous vehicle to be initiated by enabling off-vehicle monitoring of sensor inputs of the autonomous vehicle responsive to the autonomous vehicle being identified as being approached by an active emergency vehicle. The remote assistance system 122 can include a vehicle monitor component 132 that can enable remote operator(s) to monitor sensor inputs of autonomous vehicle(s). The vehicle monitor component 132 can allow the remote operator(s) to monitor the autonomous vehicle(s) which may possibly need assistance. If a remote operator determines that a remote assistance session is appropriate for an autonomous vehicle being monitored, then the remote operator can activate a remote assistance session for such autonomous vehicle. Thus, pursuant to the continuing example, the detection sharing system 128 can identify that the autonomous vehicle 2 104 is being approached by the active emergency vehicle 116. The detection sharing system 128 can send a request to the vehicle monitor component 132 to enable off-vehicle monitoring of the sensor inputs of the autonomous vehicle 2 104 responsive to the autonomous vehicle 2 104 being identified as being approached by the active emergency vehicle 116. Thereafter, a remote assistance session for the autonomous vehicle 2 104 can be initiated; the remote assistance session can be initiated based on the off-vehicle monitoring of the sensor inputs of the autonomous vehicle 2 104. For instance, the remote assistance session can be initiated responsive to a manual selection received (e.g., from a remote operator via a remote computing device) during the off-vehicle monitoring of the sensor inputs of the autonomous vehicle 2 104.

Pursuant to another example, the detection sharing system 128 can cause a remote assistance session for an autonomous vehicle to be initiated by transmitting information specifying detection of an active emergency vehicle to the autonomous vehicle responsive to the autonomous vehicle being identified as being approached by an active emergency vehicle. In accordance with the continuing example, the detection sharing system 128 can identify that the autonomous vehicle 2 104 is being approached by the active emergency vehicle 116 at the first location in the environment 108. Responsive to the autonomous vehicle 2 104 being identified as being approached, the detection sharing system 128 can transmit the information specifying the detection of the active emergency vehicle 116 at the first location in the environment 108 to the autonomous vehicle 2 104. Thus, the autonomous vehicle 2 104 can be notified by the backend computing system 110 that the autonomous vehicle 2 104 is located on a path being traversed by the active emergency vehicle 116. The autonomous vehicle 2 104 can initiate the remote assistance session at least in part on the information specifying the detection of the active emergency vehicle 116 at the first location in the environment 108 received from the detection sharing system 128 of the backend computing system 110.

Moreover, pursuant to various examples, it is contemplated that the approaches set forth herein can likewise be applied to other types of vehicles that can be detected in the environment 108. For instance, similar approaches can be utilized for a stopped school bus with a stop sign extended and lights illuminated. By way of illustration, a first autonomous vehicle can detect the stopped school bus. Following this illustration, information specifying the stopped school bus can be shared with other autonomous vehicles within proximity of the stopped school bus (e.g., causing the other autonomous vehicles to stop, initiate remote assistance sessions, etc.).

Figure 2:
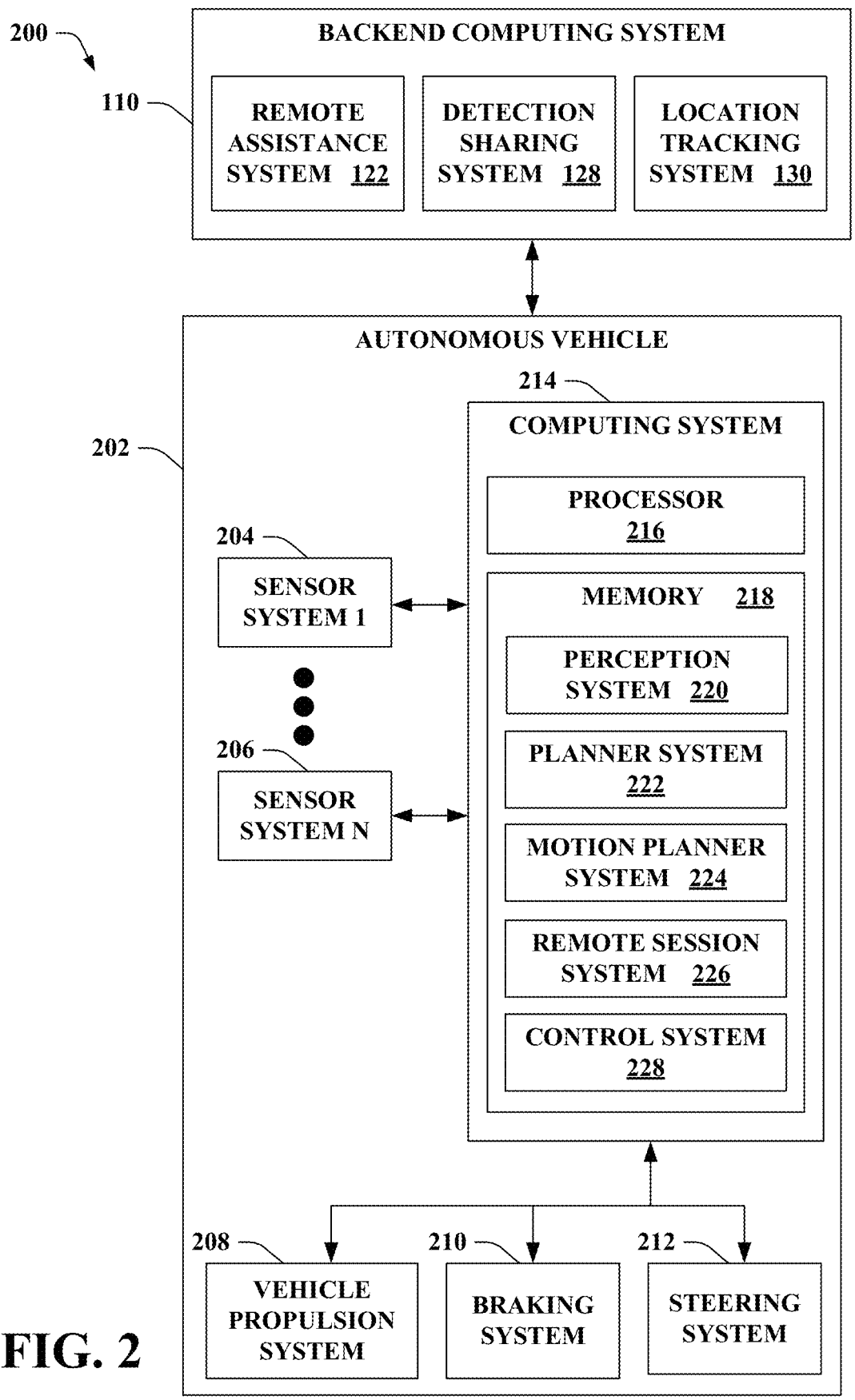
FIG. 2 illustrates a functional block diagram of an exemplary system in which detection of active emergency vehicles is shared amongst autonomous vehicles.

Now turning to FIG. 2, illustrated is another exemplary system 200 in which detection of active emergency vehicles is shared amongst autonomous vehicles. The system 200 includes the backend computing system 110, which further includes the remote assistance system 122, the detection sharing system 128, and the location tracking system 130. Moreover, the system 200 includes an autonomous vehicle 202. The autonomous vehicle 202 can be one of the autonomous vehicles 102-106 of FIG. 1.

The autonomous vehicle 202 can navigate about roadways without human conduction based upon sensor signals outputted by sensor systems of the autonomous vehicle 202. The autonomous vehicle 202 includes a plurality of sensor systems, namely, a sensor system 1 204, . . . , and a sensor system N 206, where N can be substantially any integer greater than 1 (collectively referred to herein as sensor systems 204-206). The sensor systems 204-206 are of different types and are arranged about the autonomous vehicle 202. For example, the sensor system 1 204 may be a lidar sensor system and the sensor system N 206 may be a camera (image) system. Other exemplary sensor systems included in the sensor systems 204-206 can include radar sensor systems, GPS sensor systems, sonar sensor systems, infrared sensor systems, and the like.

The autonomous vehicle 100 further includes several mechanical systems that are used to effectuate appropriate motion of the autonomous vehicle 202. For instance, the mechanical systems can include, but are not limited to, a vehicle propulsion system 208, a braking system 210, and a steering system 212. The vehicle propulsion system 208 can include an electric engine, an internal combustion engine, or a combination thereof. The braking system 210 can include an engine brake, brake pads, actuators, and/or any other suitable componentry that is configured to assist in decelerating the autonomous vehicle 202. The steering system 212 includes suitable componentry that is configured to control the direction of movement of the autonomous vehicle 202.

The autonomous vehicle 202 additionally includes a computing system 214 that is in communication with the sensor systems 204-206, the vehicle propulsion system 208, the braking system 210, and the steering system 212. The computing system 214 includes a processor 216 and memory 218; the memory 218 includes computer-executable instructions that are executed by the processor 216. Pursuant to various examples, the processor 216 can be or include a graphics processing unit (GPU), a plurality of GPUs, a central processing unit (CPU), a plurality of CPUs, an application-specific integrated circuit (ASIC), a microcontroller, a programmable logic controller (PLC), a field programmable gate array (FPGA), or the like.

The memory 218 of the computing system 214 includes a perception system 220 that can perceive objects within an environment of the autonomous vehicle 202. According to an example, the perception system 220 can detect an active emergency vehicle within vicinity of the autonomous vehicle 202 based on sensor inputs obtained by the sensor systems 204-206.

The memory 218 can further include a planner system 222 and a motion planner system 224 that can plan maneuvers performed by the autonomous vehicle 202 in the environment. The planner system 222 can select a maneuver to be performed based on the output of the perception system 220. Thereafter, the motion planner system 224 can plan motion of the autonomous vehicle 202 in time and space. According to an example, when the perception system 220 detects an active emergency vehicle approaching the autonomous vehicle 202, the planner system 222 can set a stop point for the autonomous vehicle 202. Thus, the motion planner system 224 can cause the autonomous vehicle 202 to stop in response to detecting the active emergency vehicle approaching the autonomous vehicle 202.

The memory 218 of the computing system 214 can further include a remote session system 226 that can initiate a remote assistance session in response to the perception system 220 detecting the active emergency vehicle approaching the autonomous vehicle 202. Thus, when the active emergency vehicle is detected, the autonomous vehicle 202 can be stopped (e.g., by the planner system 222 and the motion planner system 224) and a remote assistance session can be established (e.g., by the remote session system 226). Moreover, as described herein, in various scenarios the remote session system 226 need not request establishment of the remote assistance session (e.g., the detection sharing system 128 can cause the remote assistance session for the autonomous vehicle 202 to be initiated).

The memory 218 additionally includes a control system 228. The control system 228 is configured to control at least one of the mechanical systems of the autonomous vehicle 202 (e.g., at least one of the vehicle propulsion system 208, the braking system 210, and/or the steering system 212). For instance, when a remote assistance session is established, command(s) can be received by the remote session system 226 (e.g., from a remote operator via the remote assistance system 122). The command(s) received by the remote session system 226 can influence control of the vehicle propulsion system 208, the braking system 210, and/or the steering system 212 of the autonomous vehicle 202 by the control system 228.

Figure 3:
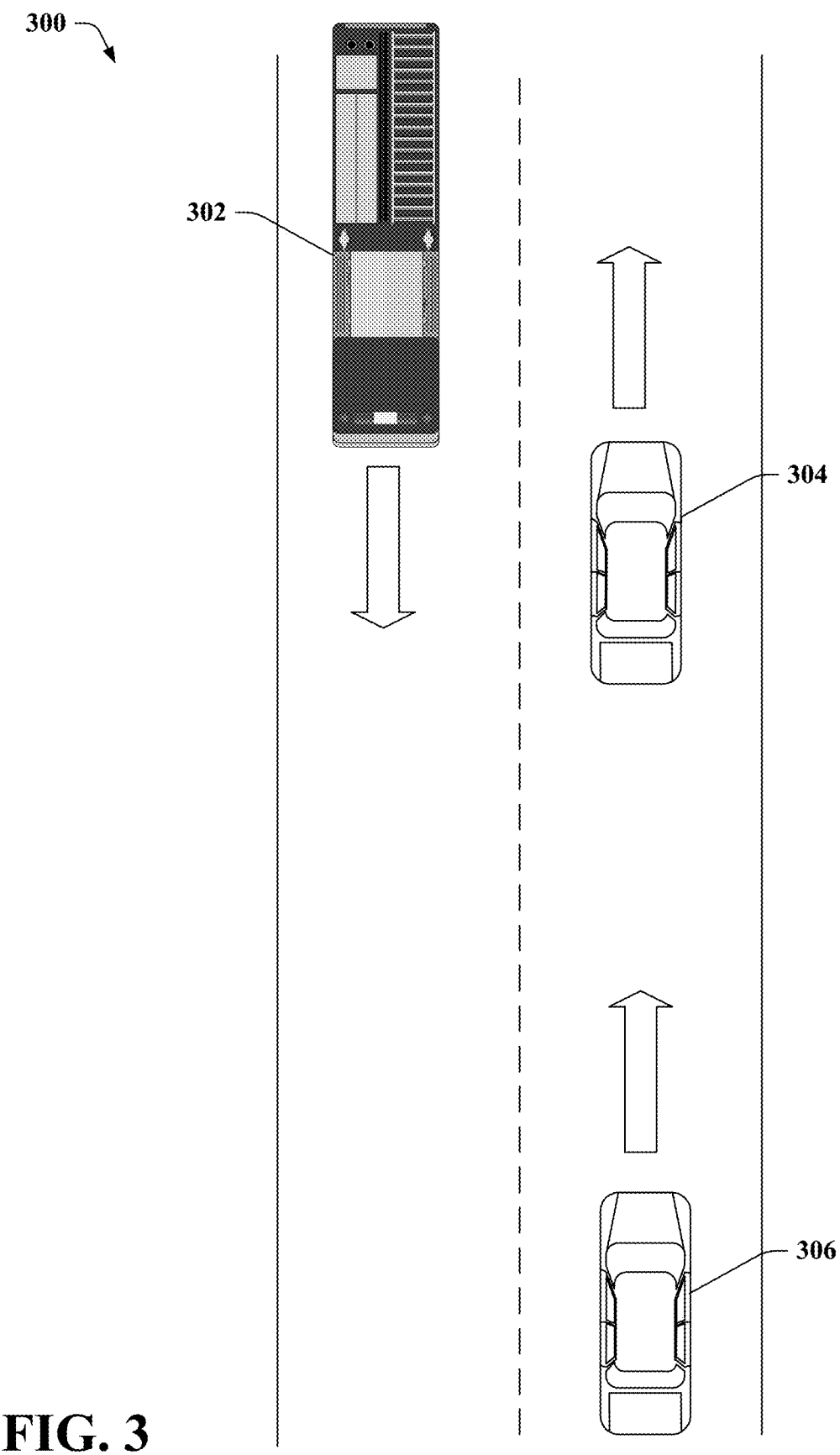
FIG. 3 illustrates an exemplary view of a portion of an environment that includes an active emergency vehicle, a first autonomous vehicle, and a second autonomous vehicle.

With reference to FIG. 3, illustrated is an exemplary view 300 of a portion of an environment that includes an active emergency vehicle 302, a first autonomous vehicle 304, and a second autonomous vehicle 306. In the example shown in FIG. 3, the active emergency vehicle 302 (e.g., a fire truck) is traveling in a first direction while the first autonomous vehicle 304 and the second autonomous vehicle 306 are traveling in the opposite direction. As described herein, the first autonomous vehicle 304 can detect the active emergency vehicle 302 at a first location in the environment. Moreover, the second autonomous vehicle 306 (at a second location in the environment) can be identified as being approached by the active emergency vehicle 302. Thus, a remote assistance session for the second autonomous vehicle 306 can be caused to be initiated based on the second autonomous vehicle 306 being identified as being approached by the active emergency vehicle 302.

The second autonomous vehicle 306 can be identified as being approached by the active emergency vehicle 302 based on the direction of travel of the active emergency vehicle 302 (e.g., the active emergency vehicle 302 is traveling in a direction towards the second autonomous vehicle 306). Moreover, the second autonomous vehicle 306 can be identified as being approached by the active emergency vehicle 302 due to the proximity between the active emergency vehicle 302 and the second autonomous vehicle 306 (e.g., within a predetermined distance).

According to an example, it is contemplated that the active emergency vehicle 302 need not be traveling towards the first autonomous vehicle 304 in order for the first autonomous vehicle 304 to detect the active emergency vehicle 302. Moreover, it is to be appreciated that the first autonomous vehicle 304 may detect the active emergency vehicle 302 with or without utilizing a remote assistance session. Pursuant to another example, the emergency vehicle 302 may be between the first autonomous vehicle 304 and the second autonomous vehicle 306 when it became active (e.g., at the time of initiating the siren and/or emergency lights). Following this example, the first autonomous vehicle 304 may still detect the active emergency vehicle 302 even though the first autonomous vehicle 304 need not respond to the active emergency vehicle 302; pursuant to this example, information concerning the detection of the active emergency vehicle 302 can be shared as described herein (e.g., to identify the second autonomous vehicle 306 as being approached by the active emergency vehicle 302).

Figure 4:
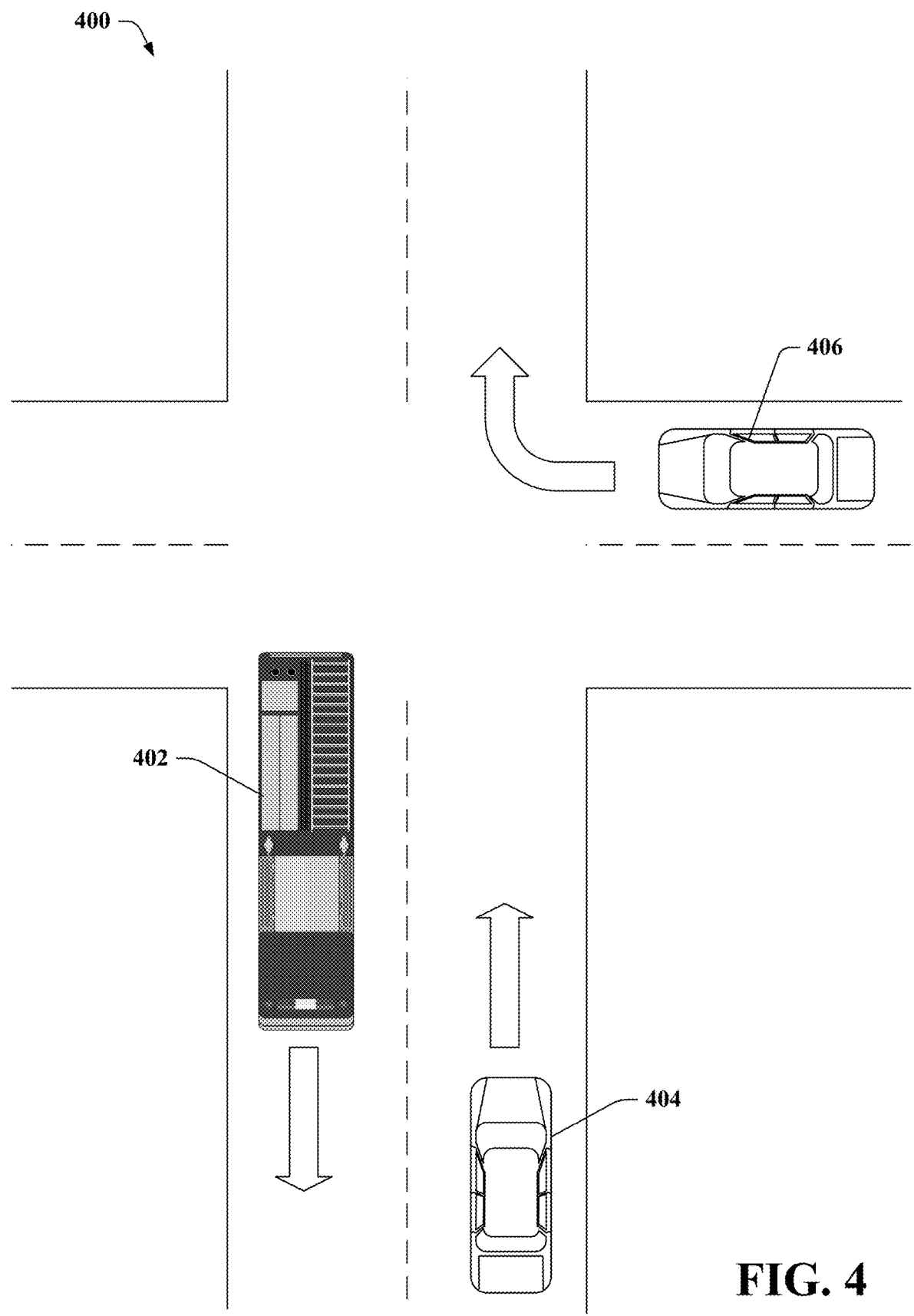
FIG. 4 illustrates another exemplary view of a portion of an environment that includes an active emergency vehicle, a first autonomous vehicle, and a second autonomous vehicle.

Turning to FIG. 4, illustrated is another exemplary view 400 of a portion of an environment. The example shown in FIG. 4 again includes an active emergency vehicle 402, a first autonomous vehicle 404, and a second autonomous vehicle 406. Similar to above, the first autonomous vehicle 404 can detect the active emergency vehicle 402 at a first location in the environment. However, in the example shown in FIG. 4, the second autonomous vehicle 406 may not be identified as being approached by the active emergency vehicle 402. More particularly, since the active emergency vehicle 402 is traveling away from the second autonomous vehicle 406 (and the second autonomous vehicle 406 is turning in a direction of travel opposite the direction the active emergency vehicle 402 is traveling), the second autonomous vehicle 406 may not be identified as being approached by the active emergency vehicle 402. Thus, in the example shown, a remote assistance session need not be initiated for the second autonomous vehicle 406 due to detection of the active emergency vehicle 402 by the first autonomous vehicle 404.

Moreover, although not shown, it is to be appreciated that there are situations in which an autonomous vehicle will respond to an active emergency vehicle when the active emergency vehicle is driving away from the autonomous vehicle. For example, if an autonomous vehicle is following the active emergency vehicle, the autonomous vehicle may desirably remain at least a predetermined distance behind the active emergency vehicle (e.g., 300 meters behind). Thus, an autonomous vehicle may pull over in some situations in which the active emergency vehicle is traveling away from the autonomous vehicle.

Figure 5:
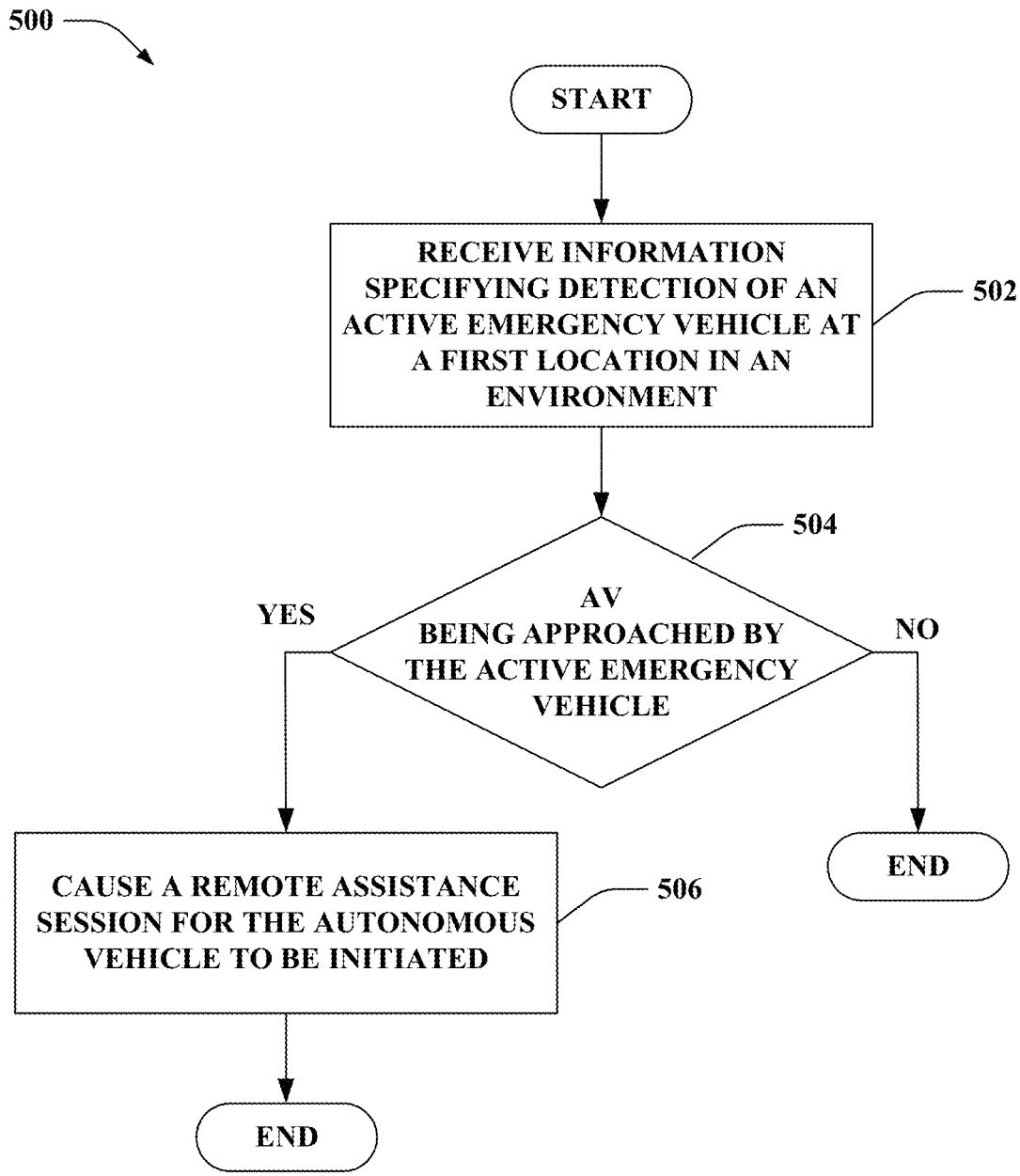
FIG. 5 is a flow diagram that illustrates an exemplary methodology for initiating a remote assistance session for an autonomous vehicle.
Figure 6:
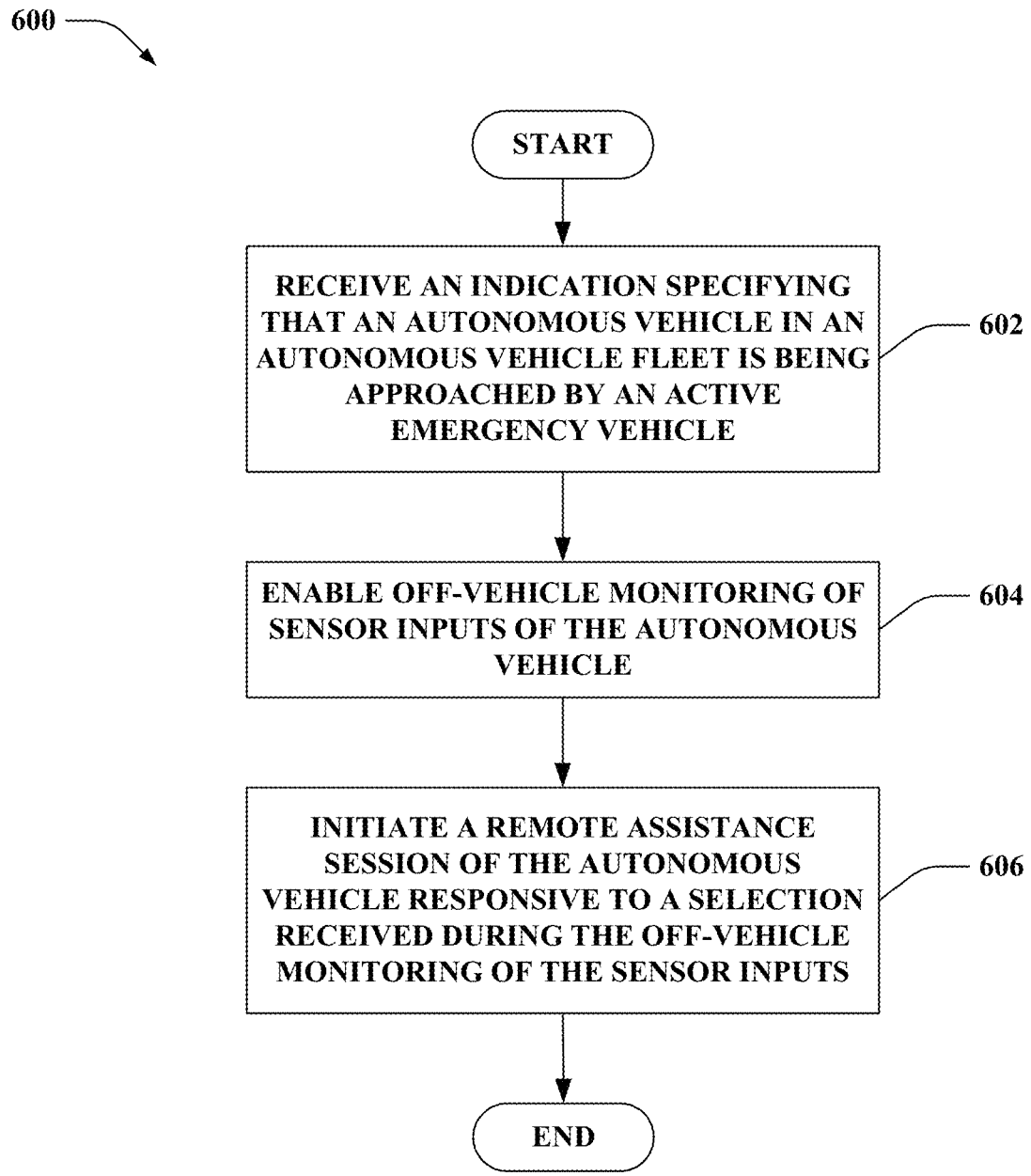
FIG. 6 is a flow diagram that illustrates another exemplary methodology for initiating a remote assistance session for an autonomous vehicle.

FIGS. 5-6 illustrate exemplary methodologies relating to initiating a remote assistance session for an autonomous vehicle. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

FIG. 5 illustrates a methodology 500 for initiating a remote assistance session for an autonomous vehicle. At 502, information specifying detection of an active emergency vehicle at a first location in an environment can be received. For instance, a siren can be sounded by the active emergency vehicle and/or an emergency light of the active emergency vehicle can be illuminated when the active emergency vehicle is detected. At 504, a determination can be made regarding whether an autonomous vehicle is being approached by the active emergency vehicle. The autonomous vehicle can be at a second location in the environment. Moreover, the autonomous vehicle can be identified as being approached by the active emergency vehicle based on the information specifying the detection of the active emergency vehicle at the first location in the environment (e.g., information specifying a direction of travel of the active emergency vehicle). Additionally, the autonomous vehicle can be identified as being approached by the active emergency vehicle based on the second location in the environment of the autonomous vehicle (e.g., the first location and the second location can be within a predetermined distance). If it is determined that the autonomous vehicle is not being approached by the active emergency vehicle at 504, then the methodology 500 can end. Alternatively, if the autonomous vehicle is identified as being approached by the active emergency vehicle at 504, then the methodology 500 can continue to 506. At 506, a remote assistance session for the autonomous vehicle can be caused to be initiated based on the autonomous vehicle being identified as being approached by the active emergency vehicle. Moreover, the autonomous vehicle can be controllable by a remote operator during the remote assistance session. It is contemplated that the determination at 504 can be made for each autonomous vehicle in an autonomous vehicle fleet (or a subset of such autonomous vehicles).

Turning to FIG. 6, illustrated is another methodology 600 for initiating a remote assistance session for an autonomous vehicle. At 602, an indication specifying that an autonomous vehicle in an autonomous vehicle fleet is being approached by an active emergency vehicle can be received. The active emergency vehicle can be detected at a first location in an environment based at least in part on sensor inputs of a differing autonomous vehicle. Moreover, the autonomous vehicle can be at a second location in the environment. At 604, off-vehicle monitoring of sensor inputs of the autonomous vehicle can be enabled responsive to receiving the indication. At 606, a remote assistance session of the autonomous vehicle can be initiated responsive to a selection received during the off-vehicle monitoring of the sensor inputs of the autonomous vehicle.

Figure 7:
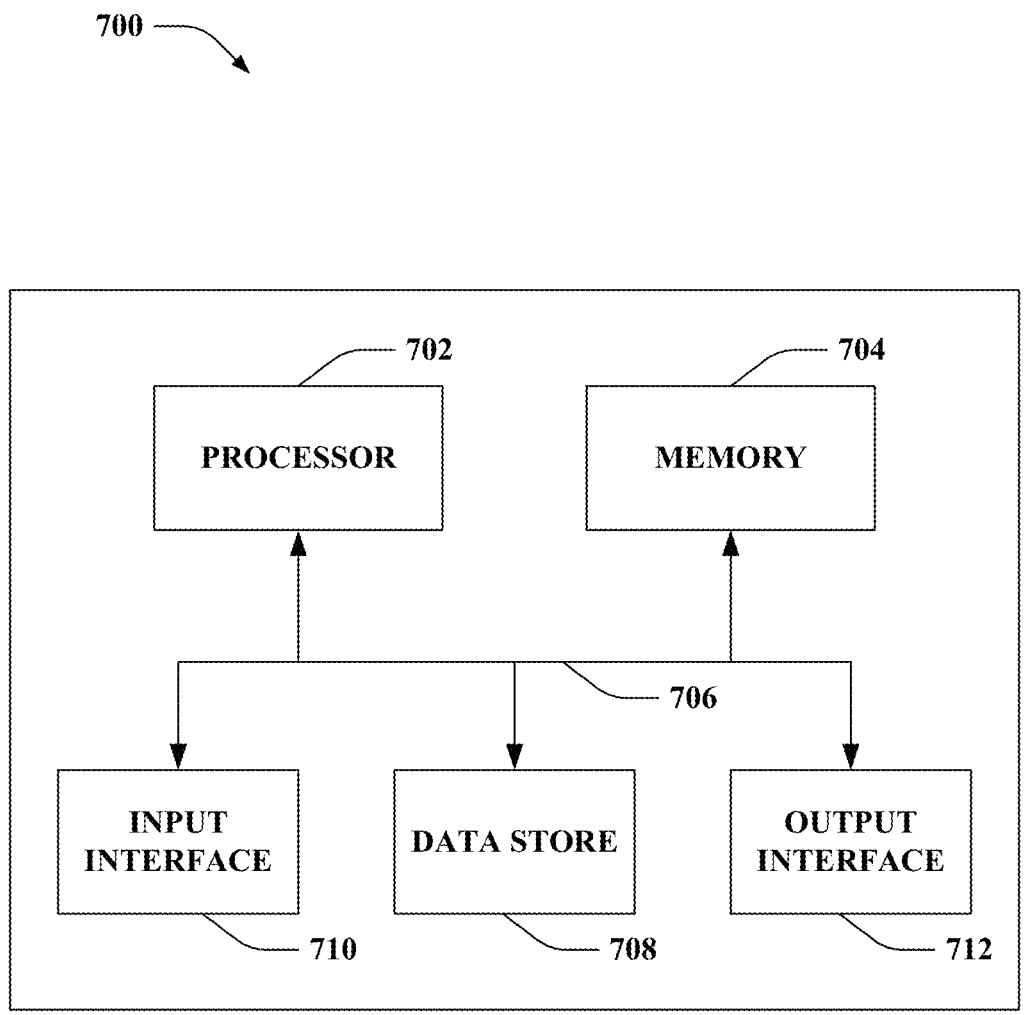
FIG. 7 illustrates an exemplary computing device.

Referring now to FIG. 7, a high-level illustration of an exemplary computing device 700 that can be used in accordance with the systems and methodologies disclosed herein is illustrated. For instance, the backend computing system 110 can be or include the computing device 700. According to another example, the computing device 700 can be or include the remote computing device 124. Pursuant to another example, the computing device 700 can be or include the computing system 214 of the autonomous vehicle 202. The computing device 700 includes at least one processor 702 that executes instructions that are stored in a memory 704. The instructions may be, for instance, instructions for implementing functionality described as being carried out by one or more systems discussed above or instructions for implementing one or more of the methods described above. The processor 702 may be a GPU, a plurality of GPUs, a CPU, a plurality of CPUs, a multi-core processor, etc. The processor 702 may access the memory 704 by way of a system bus 706. In addition to storing executable instructions, the memory 704 may also store information concerning detected active emergency vehicles in an environment, location data of autonomous vehicles in an environment, and so forth.

The computing device 700 additionally includes a data store 708 that is accessible by the processor 702 by way of the system bus 706. The data store 708 may include executable instructions, information concerning detected active emergency vehicles in an environment, location data of autonomous vehicles in an environment, etc. The computing device 700 also includes an input interface 710 that allows external devices to communicate with the computing device 700. For instance, the input interface 710 may be used to receive instructions from an external computer device, etc. The computing device 700 also includes an output interface 712 that interfaces the computing device 700 with one or more external devices. For example, the computing device 700 may transmit control signals to the vehicle propulsion system 208, the braking system 210, and/or the steering system 212 by way of the output interface 712.

Additionally, while illustrated as a single system, it is to be understood that the computing device 700 may be a distributed system. Thus, for instance, several devices may be in communication by way of a network connection and may collectively perform tasks described as being performed by the computing device 700.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. An autonomous vehicle, comprising:
    a processor; and
    memory that stores computer-executable instructions that, when executed by the processor, cause the processor to perform acts comprising:
        receiving information specifying detection of a stopped school bus with an extended stop sign and illuminated lights being approached by the autonomous vehicle in an environment, the stopped school bus with the extended stop sign and the illuminated lights being detected as being approached by the autonomous vehicle at least in part based on sensor inputs of a differing autonomous vehicle; and
        controlling operation of the autonomous vehicle based on the information specifying the detection of the stopped school bus with the extended stop sign and the illuminated lights being approached by the autonomous vehicle detected at least in part on the sensor inputs of the differing autonomous vehicle, wherein controlling the operation of the autonomous vehicle comprises causing the autonomous vehicle to stop based on the information specifying the detection of the stopped school bus with the extended stop sign and the illuminated lights being approached by the autonomous vehicle detected at least in part based on the sensor inputs of the differing autonomous vehicle,
        wherein a remote assistance session for the autonomous vehicle is automatically initiated at least one of without or prior to the autonomous vehicle attempting to initiate a remote assistance session.

2. The autonomous vehicle of claim 1, the memory further stores computer-executable instructions that, when executed by the processor, cause the processor to perform acts comprising:
    initiating the remote assistance session at least in part based on the information specifying the detection of the stopped school bus with the extended stop sign and the illuminated lights being approached by the autonomous vehicle detected at least in part based on the sensor inputs from the differing autonomous vehicle, wherein the autonomous vehicle is controllable by a remote operator during the remote assistance session.

3. The autonomous vehicle of claim 1, wherein presence of the stopped school bus with the extended stop sign and the illuminated lights is confirmed in the remote assistance session for the autonomous vehicle.

4. The autonomous vehicle of claim 1, wherein off-vehicle monitoring of sensor inputs of the autonomous vehicle is enabled responsive to the detection of the stopped school bus with the extended stop sign and the illuminated lights being approached by the autonomous vehicle.

5. A computing system, comprising:
    a processor; and
    memory that stores computer-executable instructions that, when executed by the processor, cause the processor to perform acts comprising:
        receiving information specifying detection of a stopped school bus with an extended stop sign and illuminated lights at a first location in an environment, the stopped school bus with the extended stop sign and the illuminated lights being detected at least in part on sensor inputs of a first autonomous vehicle in an autonomous vehicle fleet;
        identifying a second autonomous vehicle in the autonomous vehicle fleet approaching the stopped school bus with the extended stop sign and the illuminated lights, the second autonomous vehicle being at a second location in the environment, the second autonomous vehicle being identified as approaching the stopped school bus with the extended stop sign and the illuminated lights based on:
            the information specifying the detection of the stopped school bus with the extended stop sign and the illuminated lights at the first location in the environment; and
            the second location in the environment of the second autonomous vehicle; and
        transmitting the information specifying the detection of the stopped school bus with the extended stop sign and the illuminated lights at the first location in the environment to the second autonomous vehicle responsive to the second autonomous vehicle being identified as approaching the stopped school bus with the extended stop sign and the illuminated lights.

6. The computing system of claim 5, the memory further stores computer-executable instructions that, when executed by the processor, cause the processor to perform acts comprising:
    automatically initiating a remote assistance session for the second autonomous vehicle responsive to the second autonomous vehicle being identified as approaching the stopped school bus with the extended stop sign and the illuminated lights, wherein the second autonomous vehicle is controllable by a remote operator during the remote assistance session.

7. The computing system of claim 5, the memory further stores computer-executable instructions that, when executed by the processor, cause the processor to perform acts comprising:

enabling off-vehicle monitoring of sensor inputs of the second autonomous vehicle responsive to the second autonomous vehicle being identified as approaching the stopped school bus with the extended stop sign and the illuminated lights.

8. The computing system of claim 5, wherein the information specifying the detection of the stopped school bus with the extended stop sign and the illuminated lights at the first location in the environment is received responsive to the first autonomous vehicle detecting the stopped school bus with the extended stop sign and the illuminated lights from the sensor inputs of the first autonomous vehicle.

9. The computing system of claim 5, wherein the information specifying the detection of the stopped school bus with the extended stop sign and the illuminated lights at the first location in the environment is received responsive to confirmation of the stopped school bus with the extended stop sign and the illuminated lights being at the first location in the environment during a differing remote assistance session of the first autonomous vehicle.

10. A method for controlling an autonomous vehicle, comprising:

receiving information specifying detection of a stopped school bus with an extended stop sign and illuminated lights being approached by the autonomous vehicle in an environment, the stopped school bus with the extended stop sign and the illuminated lights being detected as being approached by the autonomous vehicle at least in part based on sensor inputs of a differing autonomous vehicle;

controlling operation of the autonomous vehicle based on the information specifying the detection of the stopped school bus with the extended stop sign and the illuminated lights being approached by the autonomous vehicle detected at least in part on the sensor inputs of the differing autonomous vehicle, wherein controlling the operation of the autonomous vehicle comprises causing the autonomous vehicle to stop based on the information specifying the detection of the stopped school bus with the extended stop sign and the illuminated lights being approached by the autonomous vehicle detected at least in part based on the sensor inputs of the differing autonomous vehicle; and initiating a remote assistance session at least in part based on the information specifying the detection of the stopped school bus with the extended stop sign and the illuminated lights being approached by the autonomous vehicle detected at least in part based on the sensor inputs from the differing autonomous vehicle, wherein the autonomous vehicle is controllable by a remote operator during the remote assistance session.

11. The method of claim 10, wherein the remote assistance session for the autonomous vehicle is automatically initiated at least one of without or prior to the autonomous vehicle attempting to initiate a remote assistance session.

12. The method of claim 10, wherein presence of the stopped school bus with the extended stop sign and the illuminated lights is confirmed in the remote assistance session for the autonomous vehicle.

13. The method of claim 10, wherein off-vehicle monitoring of sensor inputs of the autonomous vehicle is enabled responsive to the detection of the stopped school bus with the extended stop sign and the illuminated lights being approached by the autonomous vehicle.

* * * * *